United States Patent [19]

Thomas

[11] Patent Number: 4,738,277
[45] Date of Patent: Apr. 19, 1988

[54] IMPROVEMENT IN ROTATABLE TAPS

[75] Inventor: Neville G. Thomas, Glen Waverley, Australia

[73] Assignee: Dorf Industries Pty. Ltd., Victoria, Australia

[21] Appl. No.: 872,498

[22] Filed: Jun. 10, 1986

[30] Foreign Application Priority Data

Jun. 13, 1985 [AU] Australia .............................. PH01014
Jun. 26, 1985 [AU] Australia .............................. PH01221
Aug. 21, 1985 [AU] Australia .............................. PH02064

[51] Int. Cl.⁴ .............................................. F16K 25/00
[52] U.S. Cl. .......................... 137/454.5; 137/533.31; 137/614.21; 137/625.31; 251/293
[58] Field of Search ........... 137/614.2, 614.21, 625.31, 137/454.2, 454.5, 533.31; 251/293

[56] References Cited

U.S. PATENT DOCUMENTS

| | | | |
|---|---|---|---|
| 584,897 | 6/1897 | Ryan | 137/454.5 |
| 1,379,389 | 5/1921 | Brassington | 137/454.5 |
| 1,960,970 | 5/1934 | Fina | 137/533.31 X |
| 2,994,343 | 8/1961 | Banks | 137/454.5 |
| 3,389,717 | 6/1968 | Povalski | 137/454.5 X |
| 3,472,268 | 10/1969 | Sherwood | 137/454.5 X |
| 3,582,116 | 6/1971 | Young | 251/293 |

FOREIGN PATENT DOCUMENTS 883161 10/1971 Canada .............................. 137/614.2

Primary Examiner—Harold W. Weakley
Attorney, Agent, or Firm—Birch, Stewart, Kolasch & Birch

[57] ABSTRACT

A tap incorporating a tap body and a tap top assembly having an inner end in sealing engagement with the valve seat within the tap body and having a pair of ceramic discs in a housing within the tap top assembly for controlling fluid flow, and operable by a spindle. The control valve is received within a closure member, one end of which is externally threaded at so as to be screwed within an access opening to the tap body with the other end being internally threaded at to receive an externally threaded adjustment nut surrounding the spindle and cooperating with the control valve, whereby, when the tap top assembly is screwed into the tap body, the adjustment nut is operable to move said control means axially into tight engagement with the valve seat. The externally threaded adjustment nut carries a lock nut adapted to engage the closure member and lock the adjustment nut relative thereto. In one embodiment a non-return valve assembly, incorporating a jumper valve, is clipped to the end of the closure member upstream of the ceramic discs and in another embodiment a non-return jumper valve is received within a chamber downstream of the ceramic discs.

12 Claims, 4 Drawing Sheets

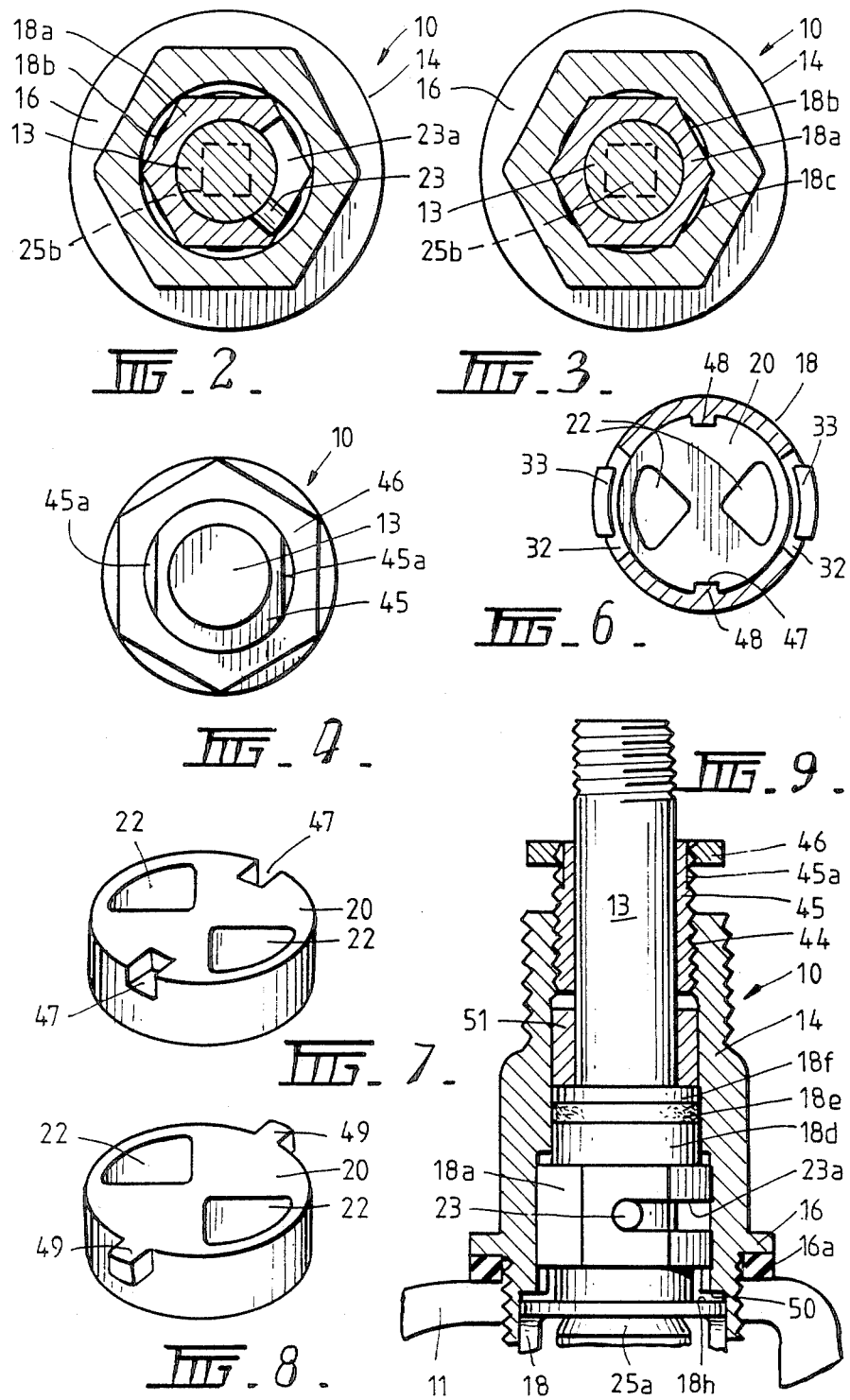

IMPROVEMENT IN ROTATABLE TAPS

BACKGROUND OF THE INVENTION

FIELD OF THE INVENTION

This invention relates to improvements in taps, and more particularly, taps of the type where only part of a full rotation of the tap spindle is necessary to facilitate full opening of the tap from a closed condition, usually a quarter or 90° turn, although the present invention is not restricted to application to such taps and includes 180° turn taps.

In some taps of the quarter turn type referred to above, an arrangement of discs, usually of ceramics, incorporating apertures therethrough has been proposed. Adjacent faces of the discs are mounted to abut each other such that rotation of one of the discs relative to the other brings the apertures through the respective discs into and out of alignment to allow operation of the tap between fully opened and fully closed conditions with only a part turn of the tap spindle, namely through 90° (quarter turn). A tap of the above general type is disclosed in the specification of Australian Pat. No. 526,072.

In order to meet the standards set down by water supply authorities, including Australian water supply authorities, and with which taps must comply, the distance between the outer surface surrounding the access opening to the interior of a tap body within which a tap top assembly is to be inserted, to the valve seat within the body, has a specified value within specified tolerances, and thus, as the inner end of the assembly is required to permanently seat in sealing engagement with the valve seat within the tap body, the corresponding length of the tap top assembly must comply with the specified distance. However, the allowable tolerances can lead to a situation where the relevant length of the tap top assembly may be less than the specified distance for the tap body thus preventing proper sealing engagement with the valve seat in the tap body, or if longer, preventing proper sealing of the tap top assembly with the tap body around the access opening within which the assembly is received.

It is also desirable that tap top assemblies be provided as replacements for tap top assemblies in existing tap bodies so as to enable conversion of an existing tap to a quarter turn tap, and thus the relevant dimensions may not be such as to ensure proper sealing engagement of the tap top assembly in the existing tap body.

SUMMARY OF THE INVENTION

It is therefore an object of the present invention to provide a tap top assembly which will allow for adjustment of the relevant distance during insertion into a tap body to accommodate differences in the dimensions of the tap bodies resulting from manufacturing tolerances allowable under the relevant standards.

Therefore, according to the invention, there is provided a tap top assembly within, or adapted to be incorporated within, a tap body with the inner end of the tap top assembly in sealing engagement with the valve seat within the tap body, means within the tap top assembly for controlling fluid flow therethrough, a rotatable spindle for operating said control means, said control means being received within a closure member, one end of said closure member being externally threaded so as to be screwed, in use, within the access opening to the tap body with the other end being internally threaded to receive an externally threaded adjustment nut surrounding said spindle and cooperating with said control means, whereby, when the tap top assembly is screwed into a tap body, the adjustment nut is operable to move said control means axially into tight engagement with the valve seat within the tap body.

Further scope of applicability of the present invention will become apparent from the detailed description given hereinafter. However, it should be understood that the detailed description and specific examples, while indicating preferred embodiments of the invention, are given by way of illustration only, since various hanges and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

Several embodiments of the invention, as applied to quarter turn ceramic disc type tap top assembly, will now be described with reference to the accompanying drawings, in which:

FIG. 2 is a sectional view taken along line 2—2 of FIG. 1;

FIG. 3 is a sectional view taken along line 3—3 of FIG. 1;

FIG. 4 is a plane view of the tap top assembly in the direction of arrows 4—4 of FIG. 1;

FIG. 6 is a section view taken along line 6—6 of FIG. 5;

FIG. 7 is a perspective view of a form of one of the ceramic discs incorporated in the assembly of the preceding drawings;

FIG. 8 is a perspective view of an alternative form of the ceramic disc of FIG. 7;

FIG. 9 is a sectional view of part of a modified form of the tap top assembly of the previous figures.

DETAILED DESCRIPTION OF PREFERRED EMBODIMENTS

Figure 1:
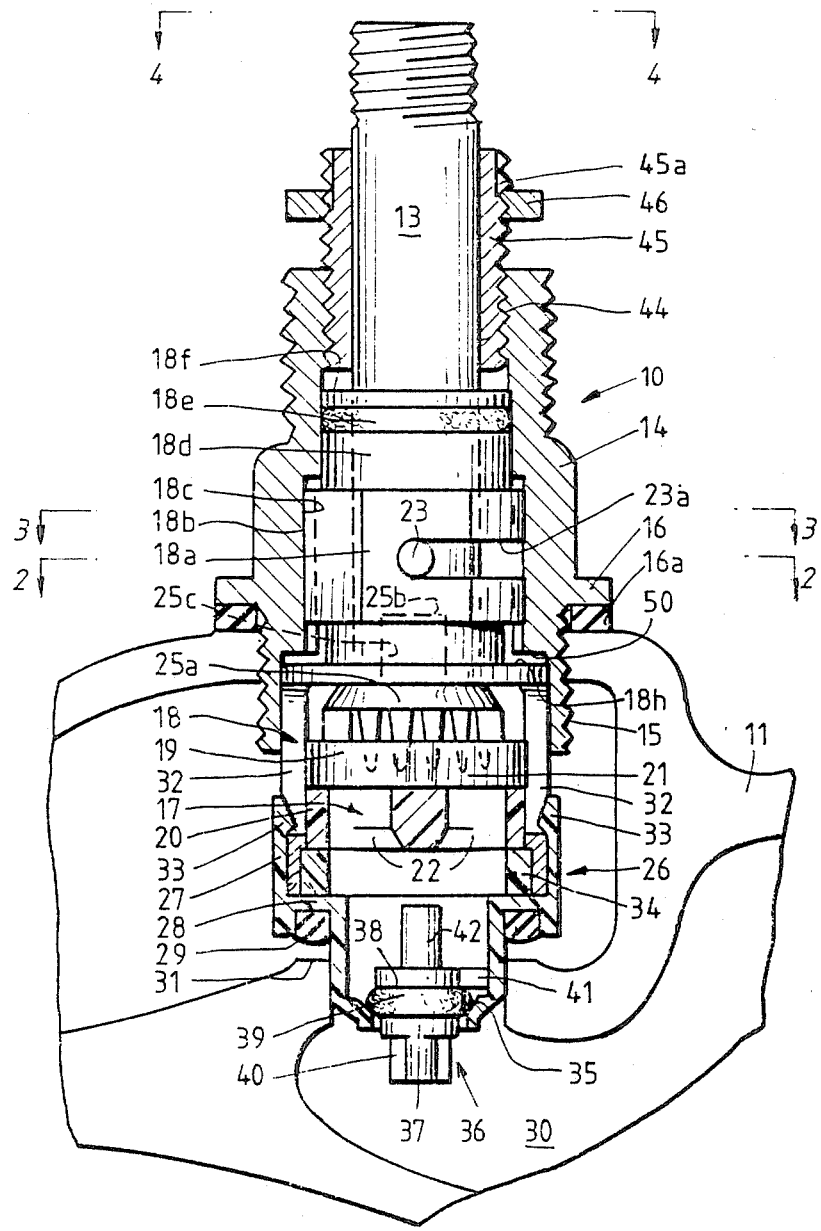
FIG. 1 is a partially sectioned view of a tap top assembly incorporating the invention and received within a tap body.
Figure 5:
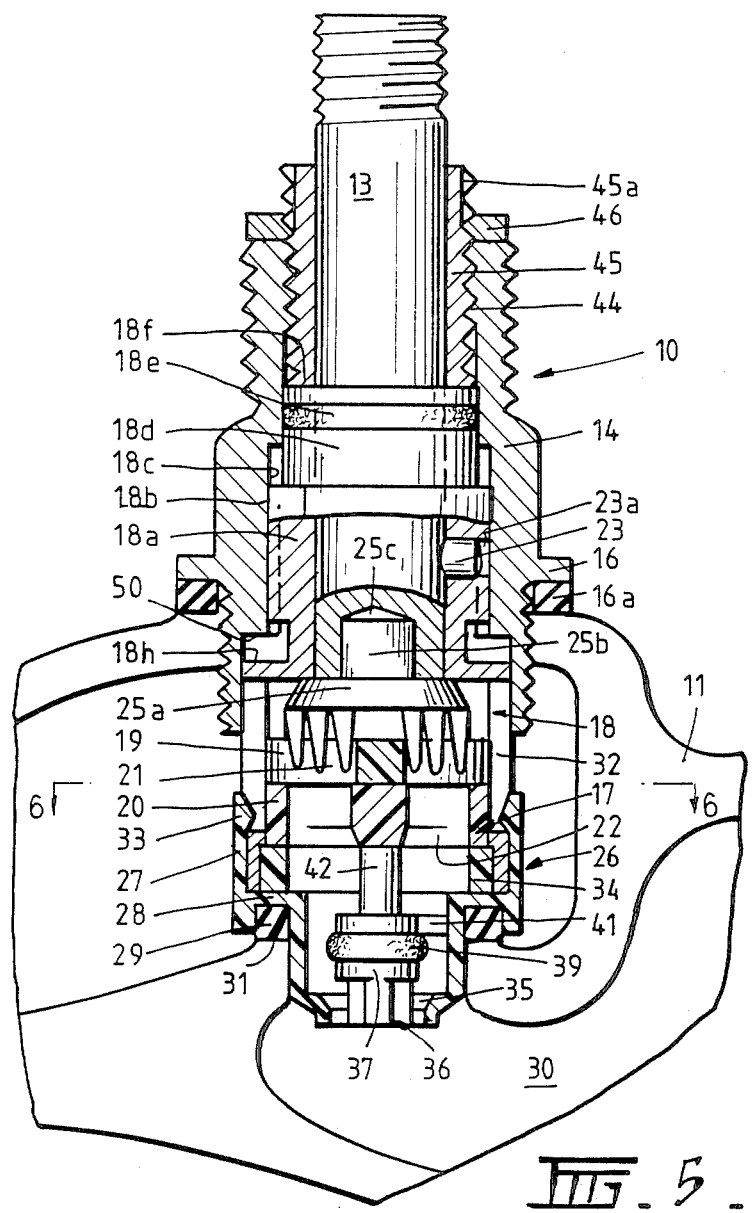
FIG. 5 is a partly sectional view similar to that of FIG. 1 showing adjustment of the assembly into tight engagement with the valve seat within the tap body.

Turning to FIGS. 1 and 5 of the drawings, there is shown a tap top assembly, generally indicated as 10, inserted within a tap body 11. The tap top assembly includes a tap spindle 13 to which a handle (not shown) is applied and which is received through a closure member 14 having an externally threaded extension 15 threadably received within an access opening in the tap body, with a sealing washer 16a interposed between a flange 16 on the closure member and the surface of the tap body surrounding the access opening.

The tap top assembly further comprises a ceramic disc assembly, generally indicated as 17, and which may be a commercially available assembly, comprising a pair of ceramic discs 19 and 20 the faces of which are in abutting relationship. The upper ceramic disc 19 has a pair of diametrically opposed V-shaped cut-outs 21 formed therein which, when rotated relative to the other disc 20 which is fixed within the housing, align with apertures 22 through the fixed disc 20 shaped as quadrants of circles and to allow fluid flow therethrough, and such that, upon rotation through 90°, or a quarter turn, the cut-outs 21 progressively move out of alignment with the apertures 22 to progressively reduce fluid flow through the assembly until they move out of complete alignment at the end of 90° of rotation and thus prevent fluid flow through the assembly. The ceramic disc assembly is received within a housing 18 with the tap spindle 13 extending through an extension 18a of the housing. In order to confine the limits of the 90° of rotation, the tap spindle 13 has radially outwardly extending pin 23, which, when the assembly is in the open position, engages one end of an arcuate slot 23a formed around and through the wall of the housing extension 18a and subtending an angle of in the order of 90° (see FIG. 2 of the drawings). Upon rotation of the spindle to move the upper ceramic disc 19 to a position where the cut-outs and apertures are out of alignment, the pin 23 engages the opposite end of the arcuate slot 23a. With reference to FIG. 3 of the drawings, the housing extension 18a has a hexagonal outer surface portion 18b which engages with a similarly shaped internal surface 18c within the closure member 14 to locate and hold the housing against rotation within the member 14. The housing extension 18a terminates in a cylindrical portion 18d with a sealing O-ring 18e and an annular end face 18f.

Rotation of the spindle 13 is transmitted to the upper closure disc 19 via a centrally disposed drive member 25a which engages the disc 19 and which has an extension 25b of appropriate non-circular cross-section, for example, square, and which engages within a similarly shaped blind hole 25c formed within the inner end of the tap spindle 13.

A non-return valve, generally indicated as 26, is attached to the inner end of the tap top assembly and comprises a housing 27, stepped at 28, and on which step a sealing ring 29 is provided to seal against a valve seat 31 within the tap body. A transfer port is provided through the end wall of the housing 27 to allow fluid flow to enter the tap top assembly from the inlet chamber 30 and thereafter pass through the aligned cut-outs and apertures through the ceramic discs such as to exit through openings 32 through the wall of the housing 27 and thereafter into the outlet chamber of the tap body. The housing 27 of the non-return valve carries a pair of diametrically opposed resiliently flexible lugs 33 having enlarged ends which, when the housing 27 is placed onto the end of the housing for the ceramic discs, will engage within two diametrically opposed ones of the openings 32 to thus retain the non-return valve housing in position. A sealing ring 34 within the end of the housing for the ceramic discs seals against the end of the non-return valve housing as shown. The inner edge of the transfer port provides a valve seat 35. A valve member 36 is received within the non-return valve housing and comprises a main body portion 37 having a circumferential groove 38 for receiving an O-ring 39 which, under return flow conditions when pressure downstream exceeds that upstream, will seat on the valve seat 35 to close the transfer port and prevent flow back through the tap top assembly from the outlet chamber to the inlet chamber of the tap body. The valve member 36 has a series of radial guide fins 40 extending therefrom and receivable within the transfer passage to guide the valve member during opening and closing movements. The series of radial spoke-like members 41 project radially from the valve member downstream of the sealing ring 39 within the non-return valve housing to guide the valve member within the housing. The gaps between the spoke-like members 41 allow for fluid flow past the non-return valve when in the open position. A further axial extension 42 on the valve member inwardly of the housing engages a central portion of the fixed ceramic disc 20 to limit opening movement of the valve member.

The closure member 14 has an internal threaded portion 44 in its outer end which receives an externally threaded adjustment nut 45 surrounding the tap spindle 13 and having diametrically opposed flats 45a formed thereon for finger or spanner adjustment.

With reference to FIGS. 6 and 7 of the drawings the fixed ceramic disc 20 is located against rotation within its housing 18 by virtue of diametrically opposed recesses 47 which receive diametrically opposed lugs 48 formed on the interior of the housing 18. Alternatively, as shown in FIG. 8, diametrically opposed lugs 49 may be provided on the disc 20 to engage in diametrically opposed slots formed along the interior of the housing 18.

With reference to FIG. 1 of the drawings, prior to insertion within the tap body, the internal assembly of the tap top assembly is shifted axially within the closure member 14 until the upper end face 18h of the housing for ceramic discs approaches or engages a step 50 within the closure member, and the threaded section 15 on the closure 14 of the assembly is screwed into position within the access opening of the tap body as shown in FIG. 1 and with the sealing ring 29 at the end of the non-return valve 26 spaced from the valve seat 31 within the tap body. Turning to FIG. 5 of the drawings, the adjustment nut 45 is then screwed inwards of the closure member until its end engages the annular end face 18f of the housing extension 18a, and on further inward screwing of the adjustment nut the internal assembly shifts axially downwardly within the closure member 14 until the sealing ring 29 on the end of the assembly moves into tight sealing engagement with the valve seat 31. It will be apparent that by virtue of the adjustment nut 45 the assembly provides for variations in the distance between the outer surface surrounding the access opening to the interior of the tap body and the valve seat 31. The adjustment nut 45 is then locked into position by a lock nut 46 threadable received about the adjustment nut and screwed into a locking position as shown in FIG. 5 whereby it engages against the upper end of the closure member 14 to lock the adjustment nut against axial movement within the closure member.

FIG. 9 of the drawings shows an alternative form of the tap top assembly of the previous figures which allows with some installation, such as behind walls, for the effective length of the assembly to be increased, and thus either the housing for the central means or the adjustment nut has to be lengthened accordingly. In this alternative the sizes of the adjustment nut and the central means can be standardized, irrespective of the length of the assembly.

With reference to FIG. 9 of the drawings, the same reference numerals have been used as for equivalent parts in the drawings of the embodiment of FIGS. 1 to 7, and in principle the assembly and its manner of insertion and adjustment is the same as described in the aforementioned embodiment, except that, in accordance with the modification the subject of the alternative embodiment of FIG. 9, a sleeve member 51 surrounding the tap spindle 13 is interposed between the inner end of the adjustment nut 45 and the annular end face 18f of the extension 18a of the housing 18 for the ceramic disc assembly. The sizes of the closure nut 45 and the ceramic disc assembly and its housing 18 and extension 18a are the same as for the assembly described in FIGS. 1 to 7 and any increase in the length of the total assembly is accommodated for by the sleeve member 51 being of a length equivalent to the increase.

In use, as with the assembly of FIGS. 1 to 7, the threaded section 15 on the closure member 14 is screwed into position within the axis opening of the tap body 11. The adjustment nut 45 is then screwed inwardly of the closure member 14 from the position shown in FIG. 1 until its end engages the upper end of the sleeve member 51, with the other end of the sleeve member engaging the annular end face 18f of the housing extension 18a. On further inward screwing of the adjustment nut 45, the internal assembly shifts axially inwardly within the closure member 14 until the sealing ring on the inner most end of the assembly moves into tight sealing engagement with the valve seat within the tap body, and the adjustment nut therefore allows for variations in the distance between the surface surrounding the axis opening and the valve seat.

With the embodiments of FIGS. 1 to 9, a non-return valve assembly 26 is provided which in turn was clipped onto the end of the tap assembly and which, via a sealing ring 34, bears against the end of the ceramic disc assembly to hold it in position.

Figure 10:
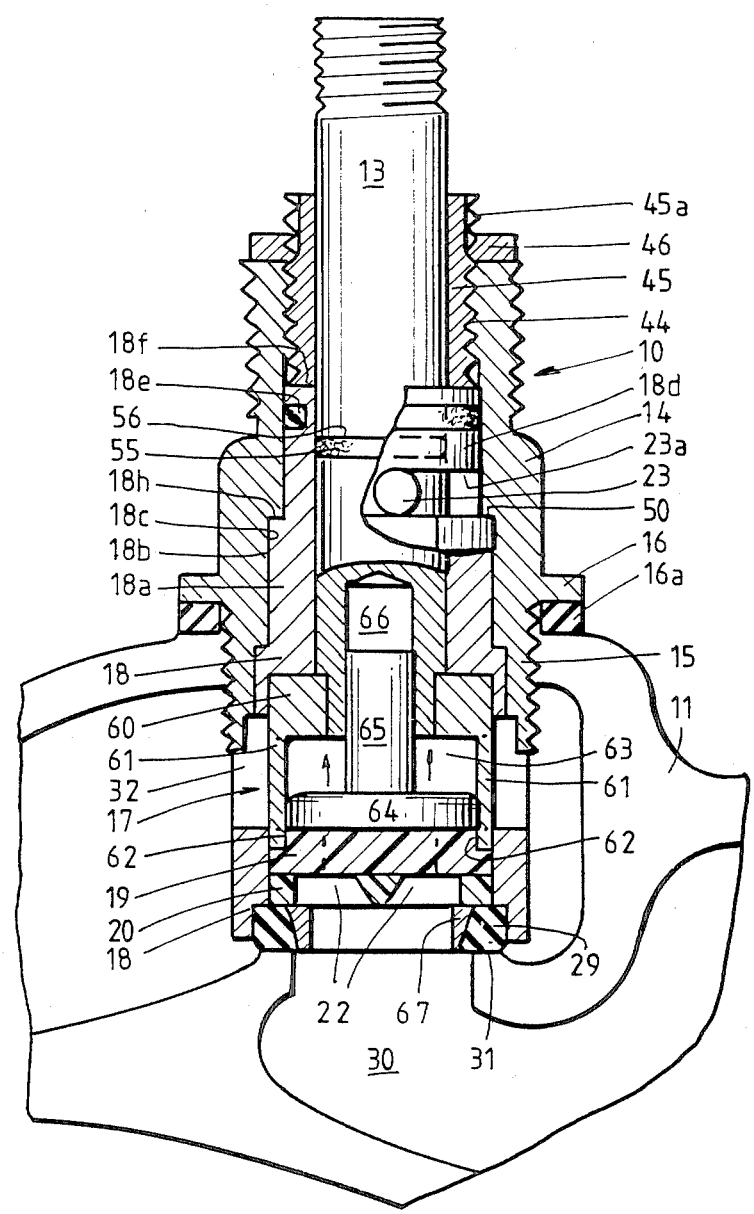
FIG. 10 is a partly sectional view of a still further modified form of the tap top assembly of the previous figures.

In a modified form of the tap top assembly, and as shown in FIG. 10, the need for the non-return valve assembly to be attached to the end of the tap top assembly is dispensed with.

Once again, with FIG. 10 of the drawings, the same reference numerals have been used for equivalent parts in the drawings of the preceding embodiments, and in principle the assembly and its manner of insertion and adjustment is the same as described in the aforementioned embodiments.

In the modified embodiment of FIG. 10, rotation of the spindle 13 is transmitted to the upper closure disc 19 via a centrally disposed drive member 60 which includes diametrically opposed downwardly extending lugs 61 which engage within diametrically opposed recesses 62 in the peripheral edge of the upper ceramic disc 19.

The drive member 60 has a central square shaped aperture which receives a mating square shaped formation on the end of the spindle 13, whereby rotation of the spindle is transmitted to the drive member 60 and, via the lugs 61, to the upper ceramic disc 19 to open and close the tap assembly.

A chamber 63 is defined between the drive member 60 and the upper ceramic disc 19, and a jumper valve 64 is positioned in that chamber with its stem 65 slidably received within a blind hole 66 in the end of the spindle 13. The pressure of fluid entering the ceramic disc assembly through the valve seat in an associated tap body lifts the jumper valve 64 off the ceramic disc assembly as shown by the arrows in FIG. 10 whereby the fluid can flow through the disc assembly when open and outwardly thereof through apertures in the wall of the housing 18 and then to the outlet from the tap body. When the fluid pressure at the outlet exceeds that on the inlet side, the jumper valve is forced downwardly within the chamber 63 and against the upper ceramic disc 19, as shown in FIG. 10, to close the apertures through the disc to prevent flow back of fluid through the tap top assembly.

As with the embodiment of FIG. 9, where in some installations the assembly needs to be lengthened, and to allow for standardization of the sizes of the adjustment nut and the central means, a sleeve member may be provided surrounding the tap spindle 13 and interposed between the inner end of the adjustment nut 45 and the annular end face 18f.

I claim:

1. A tap top assembly comprising:
   a closure member having an externally threaded end and an opposite internally threaded end;
   a rotatable spindle;
   adjustable flow control means for controlling fluid flow through said tap top, said flow control means being slidably disposed within said closure member, said adjustable flow control means comprises:
   a pair of abutting discs each having at least one aperture therethrough adapted to be moved into and out of alignment with each other;
   a housing in which said pair of abutting discs are disposed, said housing having at least one inlet opening upstream of said pair of abutting discs and at least one outlet opening downstream of said pair of abutting discs; and
   a drive means including a drive member and downwardly extending lugs for connecting said rottable spindle to at least one disc of said pair of abutting discs;
   an externally threaded adjustment nut screwed within said internally threaded end of said closure member, said externally threaded adjustment nut engaging with said adjustable flow control means for adjusting the position of said adjustable flow control means relative to said closure member, said externally threaded adjustment nut having an opening through which said rotatable spindle passes;
   a lock nut screwed on said externally threaded adjustment nut for engaging with said closure member for locking said externally threaded adjustment nut to said closure member; and
   a non-return valve incorporated within said adjustable flow control means, said non-return valve including a jumper valve movably disposed within a chamber defined between said drive member and downwardly extending lugs and one disc of said pair of abutting discs, said jumper valve having a valve stem slidable received within a hole in the end of said rotatable spindle for guiding said jumper valve within said cavity.

2. The assembly according to claim 1, including means for limiting the rotation of said rotatable spindle between fully open and fully closed positions of said adjustable flow control means.

3. The assembly according to claim 1, wherein said drive means includes downwardly extending lugs which engage within recesses in a peripheral edge of one of said pair of abutting discs.

4. The assembly according to claim 3, wherein said lugs are diametrically opposed.

5. A tap top assembly for cooperating with a threaded access opening and a valve seat of a tap body for providing an assembled adjustable flow valve, said tap top assembly comprising:
- a closure member having an externally threaded end for engaging with the threaded access opening of the tap body and having an opposite internally threaded end;
- a rotatable spindle;
- adjustable flow control means for controlling the flow through the tap top, said flow control means being slidably disposed within said closure member, said flow control means having a first end and a second end whereby said first end of said flow control means engages with said valve seat in the assembled adjustable flow valve, said adjustable flow control means comprises:
  - a pair of abutting discs each having at least one aperture therethrough adapted to be moved into and out of alignment with each other;
  - a housing in which said pair of abutting discs are disposed, said housing having at least one inlet opening upstream of said pair of abutting discs and at least one outlet oepning downstream of said pair of abutting discs; and
  - drive means including a drive member and downwardly extending lugs for connecting said rotatable spindle to at least one disc of said pair of abutting discs;
- an externally threaded adjustment nut screwed within said internally thredded end of said closure member for engaging with and biasing said adjustable flow control means into said valve seat in the assembled adjustable flow valve, said adjustment nut having a sufficient length so as to extend past said internally threaded end of said closure member in the assembled adjustable flow valve;
- a lock nut screwed on said externally threaded adjustment nut for engaging with said closure member for locking said externally thredded adjustment nut to said closure member in the assembled adjustable flow valve; and
- a non-return valve incorporated within said adjustable flow control means, said non-return valve including a jumper valve movably disposed within a chamber defined between said drive member and downwardly extending lugs and one disc of said pair of abutting discs, said jumper valve having a valve stem slidably received within a hole in the end of said rotatable spindle for guiding said jumper valve within said cavity.

6. The assembly according to claim 5, including means for limiting the rotation of said rotatable spindle between fully open and fully closed positions of said adjustable flow control means.

7. The assembly according to claim 5, wherein said drive means includes downwardly extending lugs which engage within recesses in a peripheral edge of one of said pair of abutting discs.

8. The assembly according to claim 7, wherein said lugs are diameterically opposed.

9. An adjustable flow valve comprising:
- a tap body having a threaded access opening and a valve seat;
- a tap top comprising:
  - a closure member having an externally threaded end for engaging with said threaded access opening and an opposite internally threaded end;
  - a rotatable spindle;
  - adjustable flow control means for controlling the flow through the tap top, said adjustable flow control means being slidably disposed within said closure member, said adjustable flow control means having a first end and a second end whereby said first end of said flow control means engages with said valve seat of said tap body when the adjustable flow valve is assembled, said adjustable control means comprises:
    - a pair of abutting discs each having at least one aperture therethrough adapted to be moved into and out of alignment with each other;
    - a housing in which said pair of abutting discs are disposed, said housing having at least one inlet opening upstream of said pair of abutting discs and at least one outlet opening downstream of said pair of abutting discs; and
    - drive means inluding a drive member and downwardly extending lugs for connecting said rotatable spindle to at least one disc of said pair of abutting discs;
  - an externally threaded adjustment nut screwed within said internally threaded end of said closure member for engaging with and biasing said adjustable flow control means into said valve seat of said tap body, said externally threaded adjustment nut having a sufficient length so as to extend past said internally threaded end of said closure member in the assembled adjustable flow valve;
  - a lock nut screwed on said externally threaded adjustment nut for engaging with said closure member for locking said externally threaded adjustment nut to said closure member in the assembled adjustable flow valve; and
  - a non-return valve incorporated within said adjustable flow control means, said non-return valve including a jumper valve movably disposed within a chamber defined between said drive member and downwardly extending lugs and one disc of said pair of abutting discs, said jumper valve having a valve stem slidably received within a hole in the end of said rotatable spindle for guiding said jumper valve within said cavity.

10. The valve according to claim 9, including means for limiting the rotation of said rotatable spindle between fully open and fully closed positions of said adjustable flow control means.

11. The assembly according to claim 9, wherein said drive means includes downwardly extending lugs which engage within recesses in a peripheral edge of one of said pair of abutting discs.

12. The assembly according to claim 11, wherein said lugs are diametrically opposed.

* * * * *